(No Model.)
E. S. RENWICK.
INCUBATOR.
No. 339,013. Patented Mar. 30, 1886.
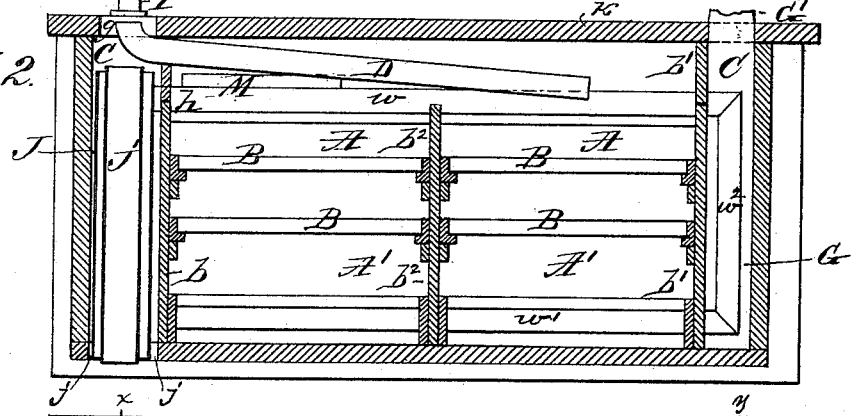
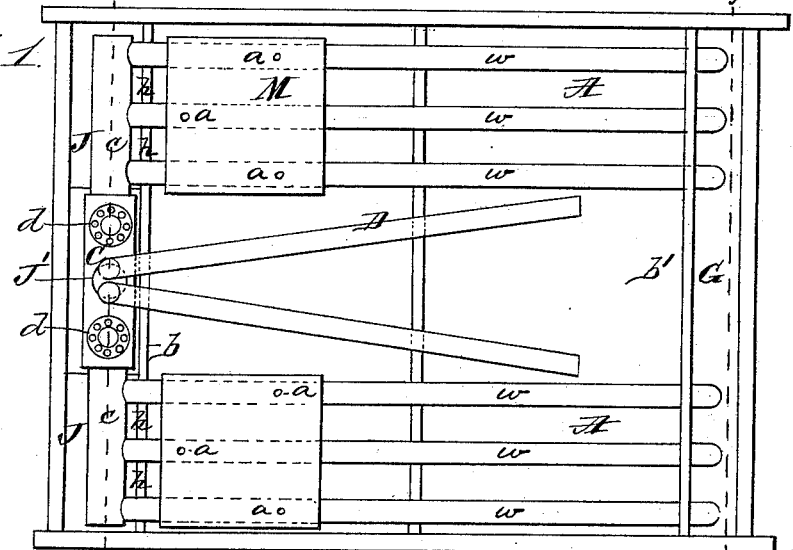
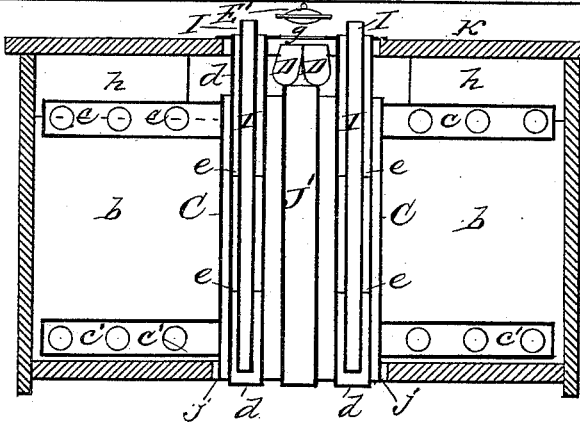
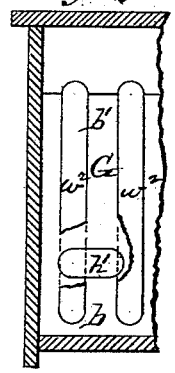
WITNESSES
W. L. Bennem
Jas. E. Warner
INVENTOR
Edward Sabine Renwick

UNITED STATES PATENT OFFICE.

EDWARD SABINE RENWICK, OF MILLBURN, NEW JERSEY.

INCUBATOR.

SPECIFICATION forming part of Letters Patent No. 339,013, dated March 30, 1886.

Application filed January 24, 1885. Serial No. 153,920. (No model.)

*To all whom it may concern:*

Be it known that I, EDWARD SABINE RENWICK, of Millburn, in the county of Essex and State of New Jersey, have made an invention of certain new and useful Improvements in Incubators; and I do hereby declare that the following, in connection with the accompanying drawings, is a full, clear, and exact description and specification of the same.

The object of the improvements which constitute the subject-matter of this patent is to diffuse the heat more equably through the incubating-chamber in which the egg-trays are placed, so as to enable two layers of egg-trays to be used with advantage; also, to insure a more rapid downward circulation of air through the incubating-chamber, and to facilitate the escape of superheated air from a portion of the incubator distant from the escape-passage and its valve.

To this end the invention consists of certain combinations of devices, which are recited in detail in the claims at the close of this specification. In order that the said combinations may be fully understood, I have represented in the accompanying drawings and will proceed to describe certain parts of an incubator embodying the invention, as well as improvements which have been described in earlier patents for incubators previously granted to me.

Figure 1 of the accompanying drawings represents a plan of the incubator with the top removed. Fig. 2 represents a central longitudinal section of the same. Fig. 3 represents a transverse section of the incubator at the line $x\,x$ of Fig. 1, and Fig. 4 represents a partial transverse section of the same at the line $y\,y$ of Fig. 1.

As I prefer to employ all of my present improvements in connection with some of those which have been described by me in previous patents, I have represented them in the accompanying drawings in what I believe to be the best form for practical use; but some of my present improvements may be employed in incubators having an ascending circulation of air in the incubating-chamber.

In the incubator represented in the accompanying drawings the egg-chamber A A′ is arranged between an air-supply pipe, J, at one end of the incubator and a ventilating-chimney, G, at the other end of the incubator. The heater C is arranged in the air-supply pipe J, and the air for ventilation enters this pipe through an opening, $j$, in the bottom of the incubator, which in this case has the lower end of the heater protruded through it, so that the opening for the admission of air surrounds the lower end of the heater, and the air is heated by the exterior surface of the heater. The heater is traversed by two upright flues, $d\,d$, which extend from its lower end upward through it, and pass out through openings in the top of the incubator, and the waste-heat chimneys I, which I prefer to use, are arranged centrally in the heat-flues at I I, perforated diaphragms $e\,e$ (one or more) being placed in the annular space between each waste-heat chimney and the wall of the heat-flue, to check the too rapid passage of the products of combustion in the heat-flue. The lamps or gas-burners by which the heat is supplied are arranged, as described in my previous patents, at the lower end of the heat-flues.

In order to heat a larger quantity of warm air for ventilation than is heated by the exterior of the heater, I arrange within the heater C an additional air-supply pipe, J′, which receives air in its lower end and delivers it in the upper part of the incubator. This additional air-supply is not essential to my present invention.

The heater C is fitted with four arms or branch pipes, $c\,c\,c'\,c'$, and the upper branch pipe, $c$, and lower branch pipe, $c'$, at each side of the heater are connected by one or more U-formed circulating-pipes, the upper member or leg, $w$, of each of which extends horizontally, or thereabout, through the upper part of the incubating-chamber, while the lower leg, $w'$, of each extends horizontally, or thereabout, through the lower part of the incubating-chamber, and the connection $w^2$ between the two legs is upright, or thereabout, and extends, by preference, through the ventilating-chimney G. The evaporating-pans M, for supplying moisture to the air in the incubating-chamber, are arranged upon the horizontal legs of the U-formed pipes, and are connected with them by means of one or more orifices, $a$, so that the evaporating-pans may be supplied with warm water from the heater. The partition $b$, which separates the air-supply pipe J from the incubating-chamber A A', is constructed with openings $h$ through its upper part, so that the air which is warmed in the air-supply pipe may pass in to the top of the incubating-chamber. The partition $b'$, which separates the ventilating-chimney G from the incubating-chamber, has openings $h'$ made through its lower portion, so that the foul air from the lower part of the incubating-chamber may pass into the lower end of the ventilating-chimney. An opening is made in the top of the incubator for the upward passage of air from that portion of the ventilating-chimney which is within the incubator, and I prefer to apply to this opening a short pipe or head, G', which constitutes an extension of the ventilating-chimney. The egg-trays B B are arranged, by preference, in two layers, both of which are between the upper and lower legs of the U-formed circulating-pipes $w\ w'$, and are supported upon slides.

When the incubator is of comparatively small size—containing, say, not exceeding two hundred and fifty eggs—there may be only two egg-trays. When the incubator is of larger size, the incubating-chamber may be divided into two sections by a transverse partition, $b^2$, which should be perforated with openings for the free circulation of air, and there may be two egg-trays in each section. In still larger incubators there may be four egg-trays in each section, each egg-tray extending from one side of the machine inward to its longitudinal center, or thereabout. The bottoms of the egg-trays should be formed either of slats or rollers or of wire-cloth, so as to permit a free circulation of air through them. The heat may be regulated by any approved means, and in order to prevent the possible overheating of the incubator I form a ventilating-opening, $g$, in the top K of the incubator and fit it with a valve, E', (shown raised or open in Fig. 3,) to control the escape of air, such air-escape valve being operated by the regulating mechanism. It is convenient to arrange this air-escape valve near one end of the incubator, so as to obviate the necessity of long connections between the said valve and the apparatus for operating it. In order, however, that hot air from the upper part of the incubator, which is at a distance from this air-escape valve E', may be permitted to escape when the valve is opened, a ventilating-pipe, D, is arranged in the upper part of the incubating-chamber, with one of its ends turned upward beneath the air-escape valve E'; hence when this is opened the air in the top of the incubating-chamber, which is at a distance from the air-escape valve, will pass through this ventilating-pipe D and escape, and the passage of air through this ventilating-pipe will be quickened by the upward movement around the upward-turned end of the pipe of the hot air from immediately beneath the ventilating-opening $g$.

I prefer to use chicken-trays in the lower part of the incubating-chamber between the lower layer of egg-trays and the lower legs, $w'$, of the circulating-pipes, so that chickens that are hatched in egg-trays with slatted or roller bottoms may be received in these chicken-trays. One or both sides of the incubating-chamber are provided with a flap door or doors, through which the egg-trays and chicken-trays may be inserted and withdrawn.

In an incubator constructed as above described the heater and circulating-pipes are filled with water, which is heated by the heat-flues and ascends in the heater C. The heated water passes through the upper branch pipes, $c$, to the U-formed circulating-pipes, traverses them, and returns to the heater C through the lower branch pipes, $c'$, so that a constant circulation of hot water is maintained in both the upper and lower portions of the incubating-chamber, which consequently is more equably heated than it would otherwise be. The air for ventilation enters the lower ends of the air-supply pipes, and is warmed as it rises in them. The warmed air passes through the openings $h$ and enters the upper part of the incubating-chamber, where it takes moisture from the evaporating-pans M. It descends through the incubating-chamber, passes through the openings $h'$, and enters the lower end of the ventilating-chimney G. As the upright members $w^2$ of the U-formed pipes are arranged in the ventilating-chimney G, they heat the air therein, thus furthering the upward draft through it, and as the head of the ventilating-chimney is by preference kept continuously open, there is a constant downward circulation of air through the incubating-chamber, while when the air-escape valve E' is opened by the regulating mechanism, when the heat rises to the highest degree permitted, hot air is permitted to escape intermittingly from the top of the incubating-chamber, so as to prevent the possibility of overheating.

The heating and circulating apparatus above described, consisting of the heater C, the upper and lower branch pipes, $c\ c'$, and the U-shaped circulating-pipes $w\ w'\ w^2$, is not only exceedingly efficient in supplying heat to both the upper and lower portions of the incubating-chamber, but is readily constructed, as the U-pipes may be of circular section. It also permits the lamps or other supply of heat to be arranged near the longitudinal center of the incubator, or near one side only thereof, as the branch pipes of the heater convey the heated water laterally from it to the places where the circulating-pipes are arranged.

For small incubators which can be heated by a single lamp or a single gas-burner, the heater may be constructed with but one heat-flue, and if it is constructed with an air-supply pipe inside of the heater the latter may be arranged at one side of the heat-flue; or, if a symmetrical arrangement is deemed best, there may be two air-supplying pipes in the heater—one at each side of a central heat-flue.

The number of U-formed circulating-pipes which are employed may be varied according to the size of the incubator. Thus with an incubator adapted to hold about one hundred eggs I find it expedient to use two U-formed circulating-pipes, one being arranged near each side of the incubating-chamber. For an incubator holding about one hundred and fifty to three hundred and fifty eggs, I find it expedient to use four circulating-pipes—two arranged near each side of the incubating-chamber. On one adapted to hold five hundred eggs I prefer to use six U-formed circulating-pipes, and in an incubator which holds one thousand eggs I prefer to use eight circulating-pipes, and I find it expedient generally to make each circulating-pipe about one and one-half inch in diameter.

If my new heating and circulating apparatus is to be used in an incubator having an upward circulation of air through the incubating-chamber, the upright members of the U-formed circulating-pipes may be in the end of the incubating-chamber farthest from the heater, and in such case evaporating-pans should be mounted upon the lower legs, $w'$, of the circulating-pipes, to supply moisture to the air entering the lower part of the incubating-chamber. I prefer to apply a small vent-tube to the upper end of the heater, to permit the escape of air therefrom, and I also prefer to supply the evaporating-pans with water by means of fonts, as described in previous patents granted to me.

I claim as my invention—

1. The combination, substantially as before set forth, of the upright heater, the branch pipes thereof, and the U-formed circulating-pipes, whose upper and lower members are connected, respectively, with the upper and lower branch pipes of the heater.

2. The combination, substantially as before set forth, of the incubating-chamber, the egg-trays thereof, the upright heater, the branch pipes of the heater, and the U-formed circulating-pipes, whose upper and lower legs are connected, respectively, with the upper and lower branch pipes of the heater, and are arranged, respectively, in the upper and lower parts of the incubating-chamber above and below the egg-trays therein.

3. The combination, substantially as before set forth, of the incubating-chamber, the ventilating-chimney connected with the lower portion of the said chamber, and the U-formed circulating-pipes having their upright portions arranged in the ventilating-chimney.

4. The combination, substantially as before set forth, of the incubating-chamber, the top thereof provided with a ventilating-opening, and the ventilating-pipe arranged in the upper part of the incubating-chamber, and communicating with the part of the incubator which is horizontally distant from the said ventilating-opening.

In witness whereof I have hereto set my hand this 13th day of January, A. D. 1885.

EDWARD SABINE RENWICK.

Witnesses:
W. L. BENNEM,
J. E. WARNER.